(12) United States Patent
Kimura

(10) Patent No.: US 7,339,757 B2
(45) Date of Patent: Mar. 4, 2008

(54) LENS BARREL

(75) Inventor: Shuzo Kimura, Saitama (JP)

(73) Assignee: Fujinon Corporation, Saitama (JP)

( * ) Notice: Subject to any disclaimer, the term of this patent is extended or adjusted under 35 U.S.C. 154(b) by 92 days.

(21) Appl. No.: 11/081,430

(22) Filed: Mar. 16, 2005

(65) Prior Publication Data
US 2005/0207034 A1 Sep. 22, 2005

(30) Foreign Application Priority Data
Mar. 18, 2004 (JP) ............ P.2004-077784

(51) Int. Cl.
*G02B 7/02* (2006.01)
(52) U.S. Cl. .............. 359/819; 359/811; 359/821
(58) Field of Classification Search ......... 359/819
See application file for complete search history.

(56) References Cited

U.S. PATENT DOCUMENTS 5,249,082 A * 9/1993 Newman .......... 359/813
5,717,528 A * 2/1998 Ihara et al. ........... 359/694
5,898,527 A * 4/1999 Sawai et al. .......... 359/819
2004/0027687 A1* 2/2004 Bittner et al. ........ 359/694

FOREIGN PATENT DOCUMENTS

| JP | 63-8884 | 3/1988 |
| JP | 10-197772 | 7/1998 |
| JP | 11-84197 | 3/1999 |
| JP | 2002-90604 | 3/2002 |

OTHER PUBLICATIONS

Japanese Abstract and machine Translation of JP 10-197772 Published Jul. 31, 1998.*

* cited by examiner

*Primary Examiner*—Jessica T Stultz
(74) *Attorney, Agent, or Firm*—Jordan and Hamburg LLP

(57) ABSTRACT

To provide a lens barrel to which a plurality of lenses is attached, enabling high-precision alignment of lens optical axes of the respective optical lenses, the lens barrel includes a first lens-retaining surface having a plurality of first ribs contacting the first optical lens; and a second lens-retaining surface having a plurality of second ribs contacting the second optical lens so that the second surface retains the second optical lens, wherein the first ribs and the second ribs are formed are arranged so as to become offset from each other in a circumferential direction of the lens barrel.

10 Claims, 3 Drawing Sheets

FIRST LENS-RETAINING SURFACE

SECOND LENS-RETAINING SURFACE

FIRST LENS-RETAINING SURFACE

SECOND LENS-RETAINING SURFACE

LENS BARREL

FIELD OF THE INVENTION

The present invention relates to a lens barrel to which an optical lens is mounted, and more particularly, to a lens barrel into which a plurality of optical lenses are press-fitted.

BACKGROUND OF THE INVENTION

When an optical lens is attached to a lens barrel by means of press-fitting, ribs (projections) are formed on an inner periphery of the lens barrel (a lens-retaining surface) or an outer periphery of the optical lens, and the optical lens is retained at the positions where the ribs are formed (i.e., by means of the projections). Thereby, tilt or eccentricity of the optical lens, which would otherwise be caused by "rattling" of a lens fit section, is prevented, and the lens optical axis can be aligned with high accuracy (see JP-A-11-84197 (FIG. 3), JP-UM-B-63-8884 (FIGS. 2, 3, and 4), JP-A-10-197772 (FIG. 2) and JP-A-2002-90604 (FIGS. 1 and 3)).

A lens barrel 100 according to the related art will be described by reference to FIG. 4.

FIG. 4A is a plan view showing that an optical lens 1 is attached to the lens barrel 100 of the related art. FIG. 4B is a cross-sectional view taken along line A-A shown in FIG. 4A. FIG. 4C is a perspective view of the lens barrel of the related art.

For attachment of the optical lens 1 to the lens barrel 100, the diameter of the optical lens is designed so as to become slightly smaller, as shown in FIG. 4A, in order to facilitate fitting of the optical lens 1. In short, rattling may occur in a lens fit section.

However, three ribs (projections) 101a to 101c are formed at uniform intervals on the inner periphery of the lens barrel 100 (a lens-retaining surface), whereby the optical lens 1 fitted into the lens barrel is brought into contact with and retained by the ribs 101a to 101c. Thus, tilt or eccentricity of the optical lens, which would otherwise be induced as a result of rattling having arisen in the lens fit section, can be prevented.

As shown in FIGS. 4B and 4C, according to the related art, three long-axis ribs (rod-shaped ribs) extending in parallel with the lens optical axis are formed on the inner periphery of the lens barrel 100. By means of long-axis ribs (projections) 101a to 101c formed so as to extend from the first lens-retaining surface to the second lens-retaining surface, a plurality of optical lenses (the first optical lens 1 and the second optical lens 2) are retained, thereby preventing tilt or eccentricity of the respective optical lenses and aligning the lens optical axis.

However, when a plurality of optical lenses are attached to the lens barrel of related art, the lens barrel 100 is resiliently deformed at the time of press-fitting of the first optical lens 1. Therefore, the force for retaining the second optical lens 2 originating from the long-axis ribs 101a to 101c formed on the inner periphery of the lens barrel is reduced, resulting in a failure to align the lens optical axis of the second optical lens 2 with high accuracy.

Namely, in the related-art lens barrel 100 having the long-axis ribs 101a to 101c formed on the inner periphery of the lens barrel, since the lens barrel 100 is resiliently deformed as the rib-formed positions expand during press-fitting of the first optical lens 1, the lens optical axis of the second optical lens attached to the lens barrel after resilient deformation cannot be aligned with high accuracy.

SUMMARY OF THE INVENTION

This invention relates to a lens barrel to which a plurality of optical lenses are attached and aims at providing a lens barrel which enables high-precision alignment of the lens optical axes of optical lenses.

To achieve the object, in a lens barrel of the present invention, a plurality of ribs (or projections) with which the press-fitted optical lenses come into contact are formed on a first lens-retaining surface for retaining a first optical lens and a second lens-retaining surface for retaining a second optical lens; and the ribs formed on the first lens-retaining surface and the ribs formed on the second lens-retaining surface are disposed at different positions from each other in a circumferential direction of the lens barrel.

According to the present invention, in the lens barrel to which a plurality of optical lenses are attached, the lens optical axes of the respective optical lenses can be aligned with high accuracy despite resilient deformation of the lens barrel due to press-fitting of the optical lenses.

DETAILED DESCRIPTION OF THE INVENTION

Embodiments of the present invention will be described hereunder by reference to the drawings.

Figure 1A:
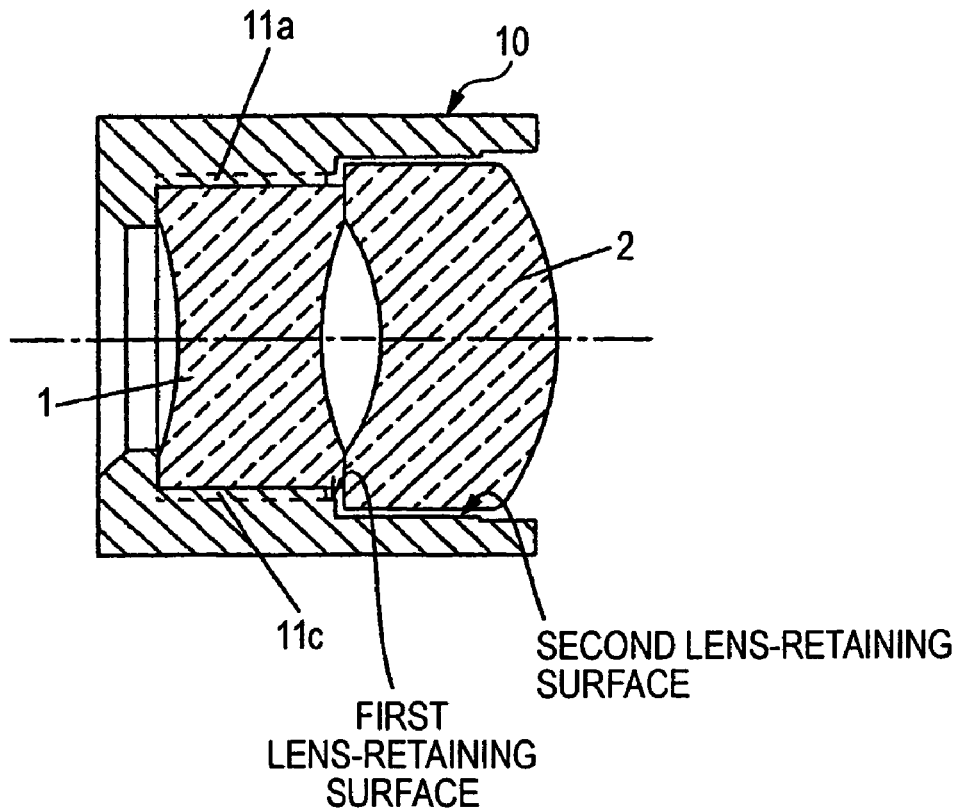
FIGS. 1A and 1B are respective cross-sectional side and end views showing a lens barrel according to a first embodiment of the present invention.

A lens barrel according to a first embodiment of the present invention will be described by reference to FIGS. 1 and 2. FIG. 1A is a cross-sectional view of a lens barrel according to a first embodiment of the present invention, and FIG. 1B is a plan view of the lens barrel.

In this embodiment, in a lens barrel 10 into which a first optical lens 1 and a second optical lens 2 are attached by means of press-fitting (see FIG. 1A), four ribs (projections) 11a to 11d (i.e., first ribs) are formed at uniform intervals on a first lens-retaining surface for retaining the first optical lens 1, and four ribs (projections) 12a to 12d (i.e., second ribs) are formed at uniform interval on a second lens-retaining surface for retaining the second optical lens 2. The ribs (rod-shaped ribs) on each of the lens-retaining surface are extending in parallel with the lens optical axis. The ribs 11a to 11d formed on the first lens-retaining surface and the ribs 12a to 12d formed on the second lens-retaining surface are arranged so as to be offset from each other in a circumferential direction of the lens barrel 10. That is, the first ribs (11a to 11d) and the second ribs (12a to 12d) are disposed at different positions between the first ribs and the second ribs in the circumferential direction, as shown in FIG. 1B.

A plurality of the ribs (projections) with which the press-fitted optical lens comes into contact is formed on each of the first lens-retaining surface and the second lens-retaining surface. The ribs 11a to 11d formed on the first lens-retaining surface and the ribs 12a to 12d formed on the second lens-retaining surface are arranged so as to be offset in a circumferential direction of the lens barrel 10. Thus, when the first optical lens 1 is press-fitted into the lens barrel 10, the plurality of ribs 11a to 11d formed on the first lens-retaining surface come into contact with the outer periphery of the first optical lens 1, to thus retain the first optical lens 1. When the second optical lens 2 is press-fitted after press-fitting of the first optical lens 1 (i.e., after resilient deformation of the lens barrel), the plurality of ribs 12a to 12d formed on the second lens-retaining surface come into contact with the outer periphery of the second lens, to thus retain the second optical lens 2.

Figure 1B:
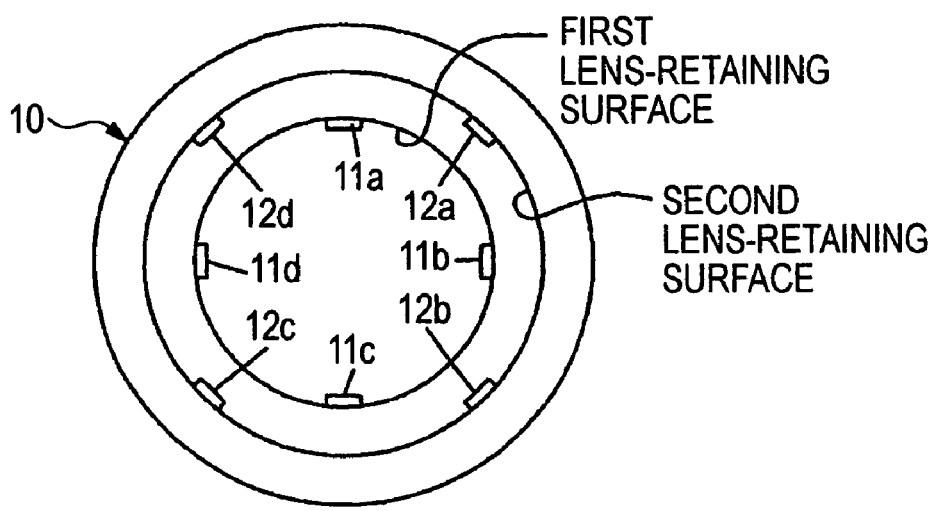

The embodiment shown in FIGS. 1A and 1B is directed toward the lens barrel 10, wherein the projecting ribs 11a to 11d formed on the first lens-retaining surface are arranged so as to be offset from the projecting ribs 12a to 12d formed on the second lens-retaining surface in the circumferential direction. As shown in the plan view of FIG. 1B, four ribs are formed at uniform intervals (an angular interval of 90°) on each of the first and second lens-retaining surfaces. The rib 12a formed on the second lens-retaining surface is arranged to come to a position that corresponds to an intermediate position between the ribs 11a and 11b formed on the first lens-retaining surface. Specifically, the ribs 12a to 12d formed on the second lens-retaining surface are arranged so as to become offset by an angle of 45° from the ribs 11a to 11d formed on the first lens-retaining surface.

Thereby, the ribs 11a to 11d formed on the first lens-retaining surface retain the first optical lens 1, and the lens optical axis of the first optical lens is aligned with high accuracy. Even when the lens barrel 10 is resiliently deformed at the time of press-fitting of the first optical lens 1, the ribs 12a to 12d formed on the second lens-retaining surface tightly hold the second optical lens 2, thereby aligning the lens optical axis of the second optical lens 2 with high accuracy.

Figure 2:
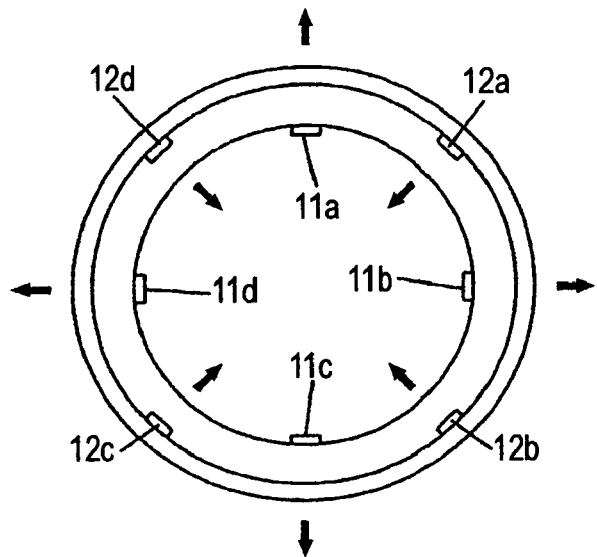
FIG. 2 is a view for describing resilient deformation of the lens barrel.

FIG. 2 is a view for describing resilient deformation of the lens barrel 10 which arises when the first optical lens 1 is press-fitted.

As shown in FIG. 2, when the first optical lens 1 is press-fitted into the lens barrel 10, the lens barrel is resiliently deformed in conformance with the shape of a fit section (i.e., the outer peripheral shape of the first optical lens and the inner peripheral shape of the lens barrel 10).

Specifically, the rib-formed positions on the inner periphery of the lens barrel 10 in which the projecting ribs 11a to 11d are formed on the first lens-retaining surface protrude, and hence the positions where the ribs 11a to 11d are formed are lifted outward by means of the first optical lens 1 press-fitted into the lens barrel, whereupon the first lens-retaining surface becomes deformed such that the rib-formed positions expand. In association with inflating-deformation of the rib-formed positions, intermediate positions between the rib-formed positions (i.e., positions located between the ribs) are pushed inward, whereupon the first lens-retaining surface is deformed such that the intermediate positions between the rib-formed positions become depressed.

In association with deformation of the first lens-retaining surface, the second lens-retaining surface adjoining the first lens-retaining surface is also deformed. In short, the areas of the second lens-retaining surface corresponding to the areas of the first lens-retaining surface where the ribs 11a to 11d are formed are lifted outward, whereupon the areas corresponding to the intermediate positions between the positions where the ribs 11a to 11d are formed are pressed downward.

Accordingly, in the lens barrel 10 where the ribs 12a to 12d formed on the second lens-retaining surface are arranged at positions corresponding to intermediate positions between the locations on the first lens-retaining surface where the ribs 11a to 11d are formed, the ribs 12a to 12d formed on the second lens-retaining surface are pressed downward by means of resilient deformation of the lens barrel 10 resulting from press-fitting of the first optical lens 1.

As a result, when the second optical lens 2 is press-fitted, the second optical lens 2 is firmly retained by the ribs 12a to 12d formed on the second lens-retaining surface, thereby aligning the optical axis of the second optical lens 2 with high accuracy.

A lens barrel according to a second embodiment of the present invention will be described by reference to FIG. 3.

Figure 3:
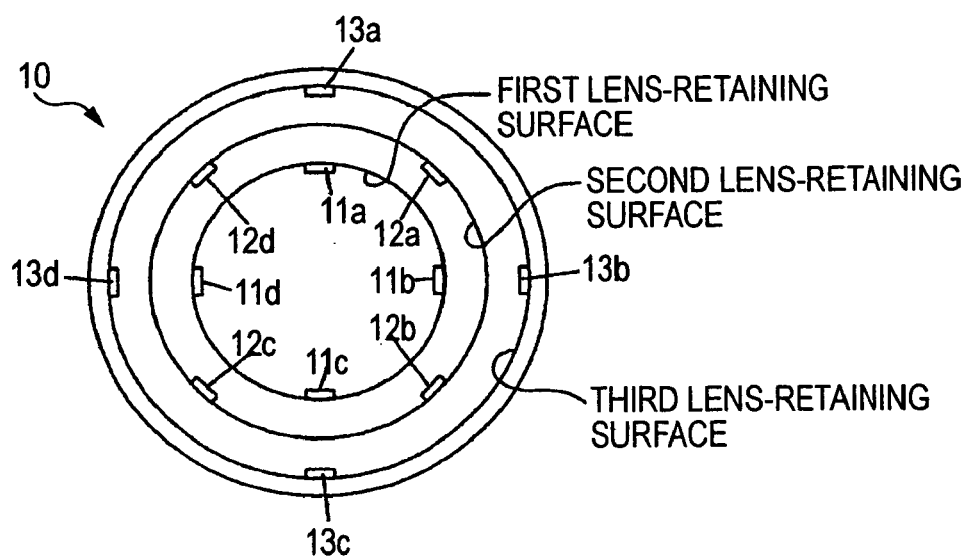
FIG. 3 is a view showing a lens barrel according to a second embodiment of the present invention.
Figure 4A:
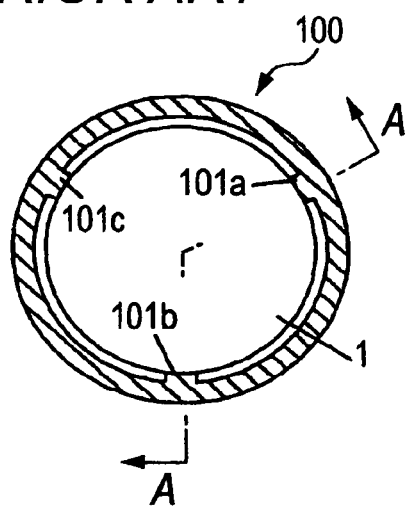
FIGS. 4A to 4C each is a view showing a lens barrel according to related art, respectively including an end cross-sectional view (FIG. 4A), a side cross-sectional view taken along line A-A in FIG. 4A (FIG. 4B) and a perspective view (FIG. 4C).
Figure 4B:
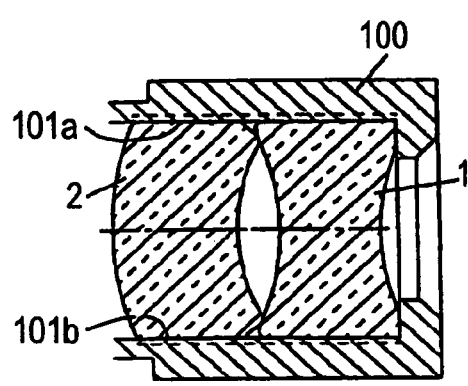
Figure 4C:
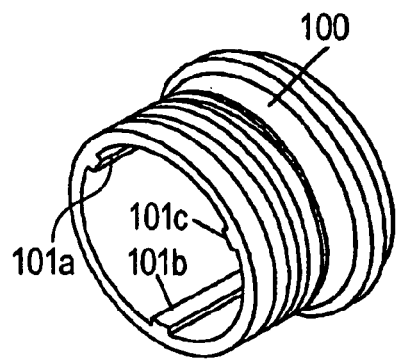

In the embodiment shown in FIG. 3, in a lens barrel 10' to which three optical lens are attached, four ribs (projections) are formed at uniform intervals on a first lens-retaining surface for retaining a first optical lens and on a second lens-retaining surface for retaining the second optical lens, as in the case of the first embodiment. Four ribs (projections) 13a to 13d are also formed at uniform intervals on a third lens-retaining surface for retaining the third optical lens. The ribs (rod-shaped ribs) on each of the lens-retaining surface are extending in parallel with the lens optical axis. The locations on the first lens-retaining surface where the ribs 11a to 11d are formed and the locations on the second lens-retaining surface where the ribs 12a to 12d are formed are offset in a circumferential direction of the lens barrel 10'. Moreover, the locations on the second lens-retaining surface where the ribs 12a to 12d are formed and the locations on the third lens-retaining surface where the ribs 13a to 13d are formed are also offset in the circumferential direction.

The ribs 12a to 12d formed on the second lens-retaining surface are arranged at positions corresponding to intermediates positions between the ribs 11a to 11d formed on the first lens-retaining surface. Further, the ribs 13a to 13d formed on the third lens-retaining surface are arranged at positions corresponding to the intermediate positions between the ribs 12a to 12d formed on the second lens-retaining surface (i.e., the positions corresponding to the locations on the first lens-retaining surface where the ribs 11a to 11d are formed).

In short, the four ribs 11a to 11d formed at uniform intervals (at angular intervals of 90°) on the first lens-retaining surface, the four ribs 12a to 12d formed at uniform intervals (at angular intervals of 90°) on the second lens-retaining surface, and the four ribs 13a to 13d formed at uniform intervals (at angular intervals of 90°) on the third lens-retaining surface are arranged so as to become offset from each other by 45° in the circumferential direction. The locations on the respective lens-retaining surfaces where the ribs are formed and positions on the respective lens-retaining surfaces where no ribs are formed are arranged so as to assume a staggered configuration among lens-retaining surfaces.

According to the lens barrel 10' of the present embodiment, the ribs 12a to 12d formed on the second lens-retaining surface are depressed inward by means of resilient deformation of the lens barrel 10 resulting from press-fitting of the first optical lens. Hence, when the second optical lens 2 is press-fitted into the lens barrel 10', the second optical lens is firmly retained by the ribs 12a to 12d formed on the second lens-retaining surface. Hence, the lens optical axis of the second optical lens can be aligned with high accuracy.

The ribs 13a to 13d formed on the third lens-retaining surface are pressed inward by resilient deformation of the lens barrel 10' resulting from press-fitting of the second optical lens. Therefore, when the third optical lens is press-fitted into the lens barrel 10', the third optical lens is firmly retained by the ribs 13a to 13d formed on the third lens-retaining surface. Hence, the optical axis of the third optical lens can be aligned with high accuracy.

As described above, in the lens barrel to which a plurality of optical lenses are attached by means of press-fitting, a plurality of ribs with which the respective optical lens comes into contact are formed on each lens-retaining surface. The locations on the adjacent lens-retaining surfaces where ribs are to be formed are offset from each other in the circumferential direction. As a result, the optical lenses are firmly retained by the ribs formed on the respective lens-retaining surfaces despite resilient deformation of the lens barrel caused by press-fitting of the optical lenses. Thereby, the lens optical axes of the plurality of optical lenses can be aligned with high accuracy.

Arbitrary lenses, such as glass lenses or plastic lenses, may be used as the optical lenses to be press-fitted into the lens barrel 10.

According to the lens barrel of the present invention, when ribs (projections) used for retaining an optical lens are formed on an inner periphery of the lens barrel, at least three ribs (projections) are preferably formed on each lens-retaining surface; particularly preferably three to six ribs, and the ribs formed on the respective lens-retaining surfaces are preferably arranged at uniform intervals.

Moreover, when the locations on the adjacent lens-retaining surfaces where the ribs are formed are arranged so as to become offset from each other in the circumferential direction, the ribs formed on one lens-retaining surface are preferably arranged at positions corresponding to intermediate positions between the locations on the other lens-retaining surface where the ribs are formed. More preferably, the ribs formed on one lens-retaining surface are preferably at positions corresponding to median positions between the locations on the other lens-retaining surface where the ribs are formed.

In the lens barrel to which three or more optical lenses are attached, the rib-formed positions on the respective lens-retaining surfaces and positions on the lens-retaining surfaces where no ribs are formed are preferably arranged in a staggered patterned between at least two of lens-retaining surfaces.

Preferably, the rib-formed positions on the respective lens-retaining surfaces and positions on the lens-retaining surfaces where no ribs are formed are preferably arranged in a staggered patterned between adjacent lens-retaining surfaces. That is, the second ribs (12a to 12d) formed on the second lens-retaining surface are arranged at intermediate positions between the first ribs (11a to 11d) formed on the first lens-retaining surface. The third ribs (13a to 13d) formed on the third lens-retaining surface are arranged at positions corresponding to intermediate positions between the second ribs (12a to 12d) formed on the second lens-retaining surface (i.e., the positions corresponding to the locations on the first lens-retaining surface where the ribs 11a to 11d are formed).

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

The present application claims foreign priority based on Japanese Patent Application No. JP2004-77784, filed Mar. 18 of 2004, the contents of which is incorporated herein by reference.

What is claimed is:

1. A lens barrel, comprising:
   a first surface having first ribs for press-fit retention of a first optical lens; and
   a second surface having second ribs for press-fit retention of a second optical lens,
   wherein the first ribs are disposed at different positions from the second ribs in a circumferential direction of the lens barrel.

2. The lens barrel according to claim 1, wherein the first surface has at least three of the first ribs, the at least three of the first ribs being disposed at uniform intervals in the circumferential direction, and
   the second surface has at least three of the second ribs, the at least three of the second ribs being disposed at uniform intervals in the circumferential direction.

3. The lens barrel according to claim 1, wherein each of the first ribs is disposed at a position in the first surface, the position corresponding to an intermediate position between adjacent two of the second ribs in the circumferential direction.

4. The lens barrel according to claim 2, wherein each of the first ribs is disposed at a position in the first surface, the position corresponding to an intermediate position between adjacent two of these second ribs in the circumferential direction.

5. A lens barrel, comprising:
   a first barrel segment having first ribs disposed on a first interior surface thereof which ran co-directionally with a lens optical axis for press-fit retention of a first optical lens inserted into said first barrel segment; and
   a second barrel segment having second ribs disposed on a second interior surface thereof which run co-directionally with said lens optical axis for press-fit retention of a second optical lens inserted into said second barrel segment, said second ribs being disposed in positions offset from corresponding positions of said first ribs in a circumferential direction.

6. The lens barrel according to claim 5, wherein said first and second barrel segments are portions of an integral barrel member.

7. The lens barrel according to claim 6, wherein said second barrel segment is located adjacent to said first barrel segment in an axial direction of said lens optical axis.

8. The lens barrel according to claim 5, wherein:
   said first ribs include at least three first ribs disposed at uniform intervals in the circumferential direction; and
   said second ribs include at least three second ribs disposed at uniform intervals in the circumferential direction.

9. The lens barrel according to claim 5, wherein said first and second barrel segments are of generally annular configuration.

10. The lens barrel according to claim 5, further comprising a third barrel segment having third ribs disposed on a third interior surface thereof which run co-directionally with said lens optical axis for press-fit retention of a third optical lens, said second barrel segment being interposed between said first barrel segment and said third barrel segment, said third ribs being circumferentially offset from said second ribs.

* * * * *